United States Patent Office 3,127,408
Patented Mar. 31, 1964

3,127,408
4-THIOCYANATO-2-BUTYNYL CARBAMATES
Thomas R. Hopkins, Prairie Village, Kans., assignor to Spencer Chemical Company, Kansas City, Mo., a corporation of Missouri
No Drawing. Filed June 8, 1960, Ser. No. 34,631
8 Claims. (Cl. 260—293.4)

This invention relates to new compositions having plant growth regulating properties and more specifically to new N-substituted 4-thiocyanato-2-butynyl carbamates and their use for inhibiting plant growth.

The present invention provides novel 4-thiocyanato-2-butynyl carbamates having the formula

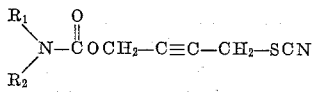

where $R_1$ is a member of the group consisting of alkyl, cycloalkyl, aryl, nuclear substituted aryl, and heterocyclic radicals; $R_2$ is a member of the group consisting of hydrogen and the radicals represented by $R_1$; and groups in which

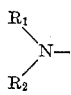

represents a heterocyclic radical with the nitrogen atom in the ring.

There are also provided by this invention plant growth inhibiting compositions comprising one or more 4-thiocyanato-2-butynyl carbamates as the active ingredient and an inert carrier as well as methods of controlling plant growth by the use of the active carbamates.

Examples of radicals represented by $R_1$ and $R_2$ include the alkyl radicals, straight or branched chain, and preferably lower alkyl radicals such as methyl, ethyl, propyl, isopropyl, butyl, pentyl, hexyl and octyl as well as the cycloalkyl radicals such as cyclopentyl and cyclohexyl. Representative aryl and nuclear substituted aryl radicals include phenyl, naphthyl, halophenyl, alkoxyphenyl, halonitrophenyl, methyl halophenyl, nitrophenyl and lower alkyl phenyl such as methylphenyl and ethylphenyl. Suitable heterocyclic radicals include 3-(1,2,4-triazolyl), thiazoyl, 2-pyridyl, furfuryl and tetrahydrofurfuryl and heterocyclic radicals in which the carbamate nitrogen atom is in the ring such as the piperidino and morpholino radicals.

The 4-thiocyanato-2-butynyl carbamates of this invention can be prepared by reaction of the corresponding 4-halo-2-butynyl carbamate with an alkali metal thiocyanate. The reaction may be represented by the equation

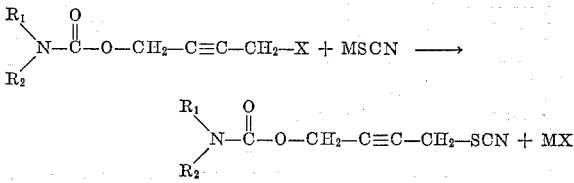

where X is a reactive halogen atom, preferably bromine or chlorine, M is an alkali metal and $R_1$ and $R_2$ have the significance previously assigned. Potassium thiocyanate and sodium thiocyanate are especially useful in the reaction. The reaction is effected by contacting the corresponding 4-halo-2-butynyl carbamate with the alkali metal thiocyanate, preferably at an elevated temperature and in the presence of an inert liquid medium. Suitable inert liquid media include acetone, methyl ethyl ketone and hydrocarbons such as benzene, n-pentane, and n-hexane. Preferably the liquid medium is a solvent for the 4-thiocyanato-2-butynyl carbamate and a nonsolvent for the by-product alkali metal halide, thus facilitating the removal of the alkali metal halide by filtration. The reaction is affected at elevated temperatures such as about 50–100° C. and is essentially completed in about 1–3 hours at such temperatures. By use of an inert solvent having a boiling point near the desired reaction temperature, close control of the temperature is readily maintained. When the reaction is completed, the by-product alkali metal halide is removed by filtration and the desired product isolated by conventional procedures such as by removal of the solvent by distillaion. The crystalline products can be purified by crystallization from hydrocarbon solvents such as benzene or n-hexane or mixtures thereof.

The intermediate 4-halo-2-butynyl carbamates may be prepared by the methods disclosed by T. R. Hopkins and J. W. Pullen, United States Patent 2,906,614 or T. R. Hopkins, R. P. Neighbors, P. D. Strickler and L. V. Phillips, Journal of Organic Chemistry, 24, 2040–42 (1959).

The following example illustrates the preparation of a representative 4-thiocyanato-2-butynyl carbamate of this invention.

EXAMPLE 1

*4-Thiocyanato-2-Butynyl N-Phenylcarbamate*

Compound 1, a stirred solution of 8.95 g. (0.04 mole) of 4-chloro-2-butynyl N-phenylcarbamate, 7.77 g. (0.08 mole) of potassium thiocyanate and 100 ml. of acetone was heated to reflux and maintained at reflux temperature for about 2 hours. The mixture was then filtered to remove the precipitated potassium chloride, another 0.08 mole of potassium thiocyanate was added to the filtrate, and the mixture stirred overnight at ambient temperature. The reaction product mixture was filtered and one liter of water was added to the filtrate. After stirring for about 30 minutes, the aqueous solution was filtered to remove the crystalline product (9.2 g.). After recrystallization from a mixture of benzene and n-hexane, the purified product melted at 90–91° C.

EXAMPLE 2

Table I sets out the physical constants of several representative 4-thiocyanato-2-butynyl carbamates of this invention which were prepared by the reaction of potassium thiocyanate with the appropriate 4-chloro-2-butynyl carbamate according to the general procedure of Example 1.

TABLE I

| Compound Number | Carbamate | Physical Constants |
|---|---|---|
| 2 | 4-thiocyanato-2-butynyl N-(3-chlorophenyl) carbamate.[1] | $n_D^{24}$, 1.5930. |
| 3 | 4-thiocyanato-2-butynyl N-(4-methylphenyl) carbamate. | M.P., 126–7° C. |
| 4 | 4-thiocyanato-2-butynyl N-(3-nitrophenyl) carbamate. | M.P., 108–9° C. |
| 5 | 4-thiocyanato-2-butynyl N-furylcarbamate. | M.P., 57–57.5° C. |
| 6 | 4-thiocyanato-2-butynyl N-n-butylcarbamate. | M.P., 55–6° C. |
| 7 | 4-thiocyanato-2-butynyl N-α-naphthylcarbamate. | M.P., 108–9° C. |
| 8 | 4-thiocyanato-2-butynyl N-cyclohexylcarbamate. | M.P., 80–1° C. |
| 9 | 4-thiocyanato-2-butynyl N-(2-chloro-4-nitrophenyl)-carbamate. | M.P., 112.5–113° C. |
| 10 | N-(4-thiocyanato-2-butynyloxycarbonyl) piperidine.[1] | $n_D^{20}$ 1.5329. |
| 11 | 4-thiocyanato-2-butynyl N,N-dimethylcarbamate.[1] | $n_D^{20}$, 1.5144. |

[1] Viscous oil.

Examples of other novel 4-thiocyanato-2-butynyl carbamates which can be prepared by the general procedure of Example 2 include:

4-thiocyanato-2-butynyl N-(3-bromophenyl)carbamate
4-thiocyanato-2-butynyl N-(2-chlorophenyl)carbamate
4-thiocyanato-2-butynyl N-(3-methoxyphenyl)carbamate
4-thiocyanato-2-butynyl N-ethyl carbamate
4-thiocyanato-2-butynyl N-isopropyl carbamate
4-thiocyanato-2-butynyl N-octylcarbamate
4-thiocyanato-2-butynyl N,N-diethylcarbamate
4-thiocyanato-2-butynyl N-tetrahydrofurfuryl carbamate
4-thiocyanato-2-butynyl N-(1,2,4-triazol-3-yl)carbamate
4-thiocyanato-2-butynyl N-methyl-N-(3-chlorophenyl)-carbamate
4-thiocyanato-2-butynyl N-allyl-N-(3-chlorophenyl)carbamate
N-(4-thiocyanato-2-butynyloxycarbonyl)morpholine
4-thiocyanato-2-butynyl N-(3-chloro-4-methylphenyl)-carbamate
4-thiocyanato-2-butynyl N-(2,6-dichlorophenyl)carbamate
4-thiocyanato-2-butynyl N-(2,4-dinitrophenyl)carbamate
4-thiocyanato-2-butynyl N-(3-hydroxyphenyl)carbamate
4-thiocyanato-2-butynyl N-(2-pyridyl)carbamate
4-thiocyanato-2-butynyl N-methyl-N-n-butylcarbamate
4-thiocyanato-2-butynyl N-methyl-N-cyclohexylcarbamate
N-(4-thiocyanato-2-butynyloxycarbonyl)phthalimide
4-thiocyanato-2-butynyl N-(4-chloro-α-naphthyl)carbamate
4-thiocyanato-2-butynyl N-(4-aminophenyl)carbamate The 4-thiocyanato-2-butynyl carbamates of this invention are useful as plant growth regulators, and especially as plant growth inhibitors. When applied to the locus or area to be protected, such as the foliage of a growing plant, or soil in which the plant is growing or is to be grown, the compounds control vegetation by inhibiting the growth of living plants and affect or inhibit the germination of seeds. Many of the compositions exhibit selective plant growth inhibition, affecting the growth of some varieties of vegetation and having little or no effect on other varieties which are closely related. For example, when 4-thiocyanato-2-butynyl N-phenylcarbamate or 4-thiocyanato-2-butynyl N-(3-chlorophenyl) carbamate are applied to the foliage of wild oats in the presence of wheat at low application rates, the wild oats are severely stunted while the wheat is only slightly inhibited or shows no adverse effect.

The method of the present invention may be carried out by applying a growth inhibiting amount of the 4-thiocyanato-2-butynyl carbamate to the foliage of plants or to soil in which the plant is growing or will grow. The carbamate is applied at a rate of about 0.05 to 200 pounds per acre, and preferably at a rate of about 0.1 to 20 pounds per acre. When used as a selective post emergence growth inhibitor, the preferred application rate is about 0.5 to 5 pounds per acre.

The high growth inhibiting activity of these carbamates requires the application of very small amounts of the active ingredients distributed uniformly over a wide area. Of course, this is difficult to do employing the pure material. However, by increasing the bulk of the material, such as by mixing the carbamate with an inert diluent or carrier, the application to growing plants and soil can be achieved more readily.

There are thus also provided by this invention novel plant growth inhibiting compositions containing one or more of the described active carbamates intimately dispersed in an inert carrier or diluent for the intended use. Such carriers may be either solid, such as talc, clay, diatomaceous earth, sawdust, calcium carbonate, and the like, or liquids such as water, kerosene, acetone, benzene, toluene, xylene and the like, in which the active agent may be either dissolved or dispersed. Emulsifying agents may be used to achieve a suitable emulsion if two immiscible liquids are used as the carrier. Wetting agents may also be used to aid in dispersing the active carbamate in liquids used as a carrier in which the carbamate is not completely soluble. Emulsifying agents and wetting agents, also known as "surface active agents," are sold under numerous trade names and may either be pure compounds, mixtures of compounds of the same general groups, or they may be mixtures of compounds of different classes. Typical satisfactory surface active agents which may be used are alkali metal higher alkylarylsulfonates such as sodium dodecylbenzenesulfonate, fatty alcohol sulfates such as the sodium salts of the monoesters of sulfuric acid with n-aliphatic alcohols containing 8–18 carbon atoms, sodium salts of alkylnaphthalenesulfonic acids, long chain quaternary ammonium compounds, sodium salts of petroleum-derived alkylsulfonic acids, polyethylene sorbitan monooleate, alkylaryl polyether alcohols, water-soluble lignin sulfonate salts, alkali-casein compositions, long chain alcohols usually containing 10 to 18 carbon atoms, and condensation products of ethylene oxide with fatty acids, alkylphenols and mercaptans.

Other additives such as a lanolin or kerosene emulsion, or Tween 20 (a product described as a sorbitan monolaurate polyoxyalkylene derivative), stickers and other auxiliary materials may be included in solid or liquid formulations to increase coverage of the active carbamate.

The following examples are presented to illustrate the growth inhibiting properties of the 4-thiocyanato-2-butynyl carbamates of this invention.

EXAMPE 3

The compounds were tested for their effect on the germination of seed.

100 mg. of the chemical was dissolved in 1 ml. of ethyl alcohol and then added to 99 ml. of water to give a 1000 p.p.m. solution. Test solutions of 100, 10 and 1 p.p.m. were made by dilution with ethanol and 10 ml. of each test solution was added to a Petri plate containing a filter paper disk. Ten seeds each of barley, wheat, wild oats, and wild mustard were placed in the plates. Three replicates of each were run. The plates were held at room temperature for three days and then rated on the basis of normal germination as compared to no germination or abnormalities in either the root or shoot. The results are presented in Table II. The compounds are identified according to their compound number as in Table I and Example 1.

TABLE II

| Compound No. | Seed Germination [1] at Chemical Concentration of— | | | | | | | | | | | |
|---|---|---|---|---|---|---|---|---|---|---|---|---|
| | Barley, p.p.m. | | | Wheat, p.p.m. | | | Wild Oats, p.p.m. | | | Wild Mustard, p.p.m. | | |
| | 100 | 10 | 1 | 100 | 10 | 1 | 100 | 10 | 1 | 100 | 10 | 10 |
| 2 | − | − | − | − | − | + | − | − | + | + | + | + |
| 4 | − | + | + | + | + | + | − | + | + | + | + | + |
| 1 | − | − | + | + | + | + | − | + | + | + | + | + |
| 5 | − | + | + | + | + | + | − | + | + | + | + | + |
| 6 | − | − | + | + | + | + | − | + | + | + | + | + |
| 8 | − | + | + | + | + | + | − | + | + | ± | + | + |
| 10 | − | + | + | + | + | + | − | + | + | + | + | + |
| 11 | − | + | + | + | + | + | − | + | + | + | + | + |
| Alcohol Check | + | + | + | + | + | + | + | + | + | + | + | + |

[1] Key to Ratings:
+Normal germination.
− No germination or abnormal.

EXAMPLE 4

The post emergence growth inhibiting activity of the compounds was determined by the following experiments. A water suspension of the 4-thiocyanato-2-butynyl carbamate was prepared by grinding together 0.4 gram of the 4-thiocyanato-2-butynyl carbamate to be tested and 4 drops of Emulphor EL (a polyoxyethylated vegetable oil) in a mortar. A few drops of water were added and when the mixture was workable, additional water was added to bring the volume up to 20 ml. Twenty ml. of a kerosene emulsion—19% kerosene and 1% Emulphor EL in water—was added.

Wild oats (*Avena fatua*), wheat, radish, flax, millet, alfalfa, tomatoes and sugar beets were planted in four-inch pots in the greenhouse. When the plants had reached a suitable growth (3–8 inches), they were sprayed with the above water emulsion of each chemical to be tested at a rate of five pounds of the 4-thiocyanato-2-butynyl carbamate per acre and a spray volume of 60 gallons per acre. Two weeks after application the plants were observed and the results of treatment recorded as in Table III.

TABLE III

| Compound No. | Effects [1] on Various Crops | | | | | | | |
|---|---|---|---|---|---|---|---|---|
| | Wild Oats | Wheat | Radish | Flax | Millet | Alfalfa | Tomato | Sugar Beet |
| 1 | G3 | G1 | 0 | N1* | 0 | N2 | 0 | 0 |
| 3 | 0 | N1 | 0 | N1 | 0 | 0 | N1 | 0 |
| 4 | 0 | 0 | N2 | N1 | 0 | 0 | 0 | 0 |

[1] Key to Ratings:
G = inhibition of growth.
N = necrosis.
0 = no effect.
1 = slight (<25% affected foliage).
2 = moderate (25-70% affected foliage).
3 = severe (71-99% affected foliage).
* = "lazy stem."

EXAMPLE 5

Compounds 1 and 2 were tested as growth regulants for wild oats and wheat at lower application rates as described by the following procedure.

Diminishing amounts of the compounds were dissolved in a mixture of eight parts by volume of Velsicol AR50G (a mixture of methylated naphthalenes) and one part by volume of Atlox 2081 (an alkyl aryl sulfonate blended with polyoxyethylene sorbitan esters of mixed fatty and resin acids) to give an application rate of 1, ½, ¼, ⅛, ¹⁄₁₆ pound per acre. Nine parts (by volume) of water was added to one part (by volume) of each solution of chemical to give an aqueous emulsion of the compounds.

Wild oats and Selkirk wheat were sprayed with the aqueous emulsions at each application rate and a spray volume of 10 gallons per acre when the wild oats were at the 1½ leaf stage. A control plot was sprayed with the formulation containing no carbamate. One month after spraying the heights of the plants were measured. There was no adverse effect observed on the wheat. The effect on the wild oats is recorded in Table IV.

TABLE IV

| Compound No. | Wild Oat Height [1] (cm.) at Application Rate of— | | | | | |
|---|---|---|---|---|---|---|
| | 1 lb./A. | ½ lb./A. | ¼ lb./A. | ⅛ lb./A. | ¹⁄₁₆ lb./A. | 0 (Control) |
| 1 | 22 | 30 | 34 | 36 | 40 | 40 |
| 2 | 10 | 10 | 14 | 29 | 35 | 40 |

[1] Average of four replicates.

As can be seen from the data of Table IV, compounds 1 and 2 are selective growth inhibitors for wild oats in the presence of wheat. At low application rates wild oats are severely stunted while wheat is not effected.

When used as a selective post emergence growth inhibitor for wild oats, it has been found that excellent control is obtained when the carbamates are applied during the two leaf stage of the wild oat plant at low application rates. Thus, by careful timing of application, a small amount, such as one pound per acre or less, of the chemical gives a high degree of growth inhibition.

The 4-thiocyanato-2-butynyl carbamates of the present invention also possess nematocidal activity. For example, in a contact nematocide test in which yound adult Panagrellus nematodes were placed in an aqueous suspension containing 500 p.p.m. of the active carbamate and then observed after 7 days, compound 3 gave a 100% kill and compound 7 gave a 90% kill.

Various changes and modifications of the invention can be made, and to the extent that such variations incorporate the spirit of this invention, they are intended to be included within the scope of the appended claims.

I claim:
1. A 4-thiocyanato-2-butynyl carbamate having the formula

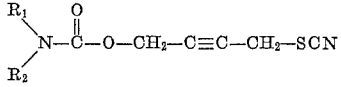

wherein $R_1$ is selected from the class consisting of alkyl, cyclopentyl, cyclohexyl, phenyl, naphthyl, halophenyl, alkoxyphenyl, halonitrophenyl, methylhalophenyl, nitrophenyl, lower alkylphenyl, 3-(1,2,4-triazolyl), thiazoyl, 2-pyridyl, furfuryl and tetrahydrofurfuryl; wherein $R_2$ is selected from the class consisting of hydrogen, lower alkyl and allyl; and wherein $R_1$ and $R_2$ together with the nitrogen atom to which they are attached can represent a group selected from the class consisting of piperidino and morpholino.

2. 4-thiocyanato-2-butynyl N-phenylcarbamate.
3. 4-thiocyanate-2-butynyl N-(3-chlorophenyl)carbamate.
4. 4-thiocyanato-2-butynyl N-(4-methylphenyl)carbamate.
5. 4-thiocyanato-2-butynyl N-(3-nitrophenyl)carbamate.
6. 4-thiocyanato-2-butynyl N-butylcarbamate.
7. N-(4-thiocyanato-2-butynyloxycarbonyl)piperidine.
8. 4-thiocyanato-2-butynyl-N-allyl-N-(3-chlorophenyl) carbamate.

References Cited in the file of this patent
UNITED STATES PATENTS

| 2,617,818 | Mowry | Nov. 11, 1952 |
| 2,844,584 | Gundel et al. | July 22, 1958 |
| 2,866,804 | Nischk et al. | Dec. 30, 1958 |
| 2,940,844 | Gysin et al. | June 14, 1960 |
| 2,945,752 | Mussel | July 19, 1960 |